US012179674B2

United States Patent
Krüger et al.

(10) Patent No.: US 12,179,674 B2
(45) Date of Patent: Dec. 31, 2024

(54) CAMERA ARRANGEMENT FOR MOUNTING IN A VEHICLE

(71) Applicant: VEONEER SWEDEN AB, Vargarda (SE)

(72) Inventors: Tomas Krüger, Linköping (SE); Fredrik Hagstrand, Linköping (SE)

(73) Assignee: MAGNA ELECTRONICS SWEDEN AB, Vargarda (SE)

( * ) Notice: Subject to any disclaimer, the term of this patent is extended or adjusted under 35 U.S.C. 154(b) by 280 days.

(21) Appl. No.: 17/761,341

(22) PCT Filed: Sep. 15, 2020

(86) PCT No.: PCT/EP2020/075777
§ 371 (c)(1),
(2) Date: Mar. 17, 2022

(87) PCT Pub. No.: WO2021/052967
PCT Pub. Date: Mar. 25, 2021

(65) Prior Publication Data
US 2022/0340090 A1    Oct. 27, 2022

(30) Foreign Application Priority Data
Sep. 18, 2019   (EP) .................................... 19198047

(51) Int. Cl.
*B60R 11/04*       (2006.01)
*G03B 17/55*       (2021.01)
(Continued)

(52) U.S. Cl.
CPC .............. *B60R 11/04* (2013.01); *G03B 17/55* (2013.01); *G03B 17/561* (2013.01); *H04N 23/52* (2023.01); *B60R 2011/0026* (2013.01)

(58) Field of Classification Search
CPC . B60R 11/04; B60R 2011/0026; H04N 23/52; G03B 17/55; G03B 17/561
(Continued)

(56) References Cited

U.S. PATENT DOCUMENTS 8,339,453 B2    12/2012    Blake, III et al.
10,144,364 B2   12/2018    Furutake
(Continued)

FOREIGN PATENT DOCUMENTS

| EP | 2930065 A1 | 10/2015 |
| GB | 2402572 A | 12/2004 |
| JP | 2019-137288 A | 8/2019 |

OTHER PUBLICATIONS

International Search Report and Written Opinion of PCT/EP2020/075777, mailed Nov. 16, 2020.
(Continued)

*Primary Examiner* — Matthew David Kim
(74) *Attorney, Agent, or Firm* — DICKINSON WRIGHT PLLC

(57) ABSTRACT

A camera arrangement (3) for mounting in a vehicle (1) and including a carrier arrangement (4) configured so as to be attached to the vehicle (1) in order to support a camera housing (6) which carries a camera unit (8). The camera arrangement (3) further including a fan unit (12) with a fan wheel (12a) which is configured for forcing air heated by the camera arrangement (3) into the interior of the vehicle (1), and a fan motor (12b) for operating the fan wheel (12a). Furthermore, the fan motor (12b) includes a fan motor axle (12c) which is connected to the fan wheel (12a) and which is configured with a generally vertical orientation when the camera arrangement (3) is mounted in the vehicle (1).

10 Claims, 7 Drawing Sheets

(51) Int. Cl.
   *G03B 17/56*   (2021.01)
   *H04N 23/52*   (2023.01)
   *B60R 11/00*   (2006.01)

(58) Field of Classification Search
   USPC .......................................................... 348/148
   See application file for complete search history.

(56) References Cited

U.S. PATENT DOCUMENTS

| | | |
|---|---|---|
| 11,220,223 B2 | 1/2022 | Takagi |
| 2008/0074509 A1 | 3/2008 | Sano |
| 2012/0013741 A1 | 1/2012 | Blake, III et al. |
| 2013/0076905 A1 | 3/2013 | Sano |
| 2013/0286280 A1* | 10/2013 | Siann ..................... H04N 23/51 |
| | | 348/372 |
| 2015/0342091 A1* | 11/2015 | Scharinger ......... H05K 7/20909 |
| | | 165/80.3 |
| 2017/0064175 A1* | 3/2017 | Furutake .................. G02B 3/02 |
| 2017/0064877 A1* | 3/2017 | Ratcliffe ................ H04N 23/51 |
| 2017/0113611 A1* | 4/2017 | Thompson ............. H04N 13/25 |
| 2017/0131621 A1* | 5/2017 | Tang .................... G03B 17/561 |
| 2017/0184945 A1* | 6/2017 | Carlson .................. G03B 17/02 |
| 2017/0274837 A1* | 9/2017 | Kasai ..................... B60R 11/04 |
| 2018/0263104 A1* | 9/2018 | Hamada ................ H04N 23/52 |
| 2019/0248300 A1 | 8/2019 | Takagi |
| 2021/0306538 A1* | 9/2021 | Solar ..................... H04N 23/52 |

OTHER PUBLICATIONS

First Office Action of JP 2022-515139, mailed Feb. 27, 2023.
English translation of First Office Action of JP 2022-515139, mailed Feb. 27, 2023.

* cited by examiner

CAMERA ARRANGEMENT FOR MOUNTING IN A VEHICLE

CROSS-REFERENCE TO RELATED APPLICATIONS

This application is a 35 U.S.C. § 371 national phase of PCT International Application No. PCT/EP2020/075777, filed Sep. 15, 2020, which claims the benefit of priority under 35 U.S.C. § 119 to European Patent Application No. 19198047.3, filed Sep. 18, 2019, the contents of which are incorporated herein by reference in their entirety.

The present disclosure relates to a camera arrangement for mounting in a vehicle and including a carrier arrangement configured so as to be attached to the vehicle in order to support a camera housing which carries a camera unit. The camera arrangement includes a fan unit with a fan wheel which is configured for forcing air heated by the camera arrangement into the interior of the vehicle, and a fan motor for operating the fan wheel.

BACKGROUND

Today, there exist different types of detection and sensor systems for road vehicles, by means of which various objects in the surroundings of the vehicles can be detected and analyzed. For this reason, such detection and sensor systems may include camera units for providing images and video sequences. Alternatively, such systems may incorporate equipment such as radar systems, navigation systems, Lidar systems and other sensors and detectors.

Furthermore, such detection and sensor systems can be used in connection with, for example, automated vehicle systems for speed control and collision prevention, and also in the field of autonomously driving vehicles.

According to prior technology, a carrier arrangement can be configured for supporting a camera unit or similar type of equipment. Such a carrier arrangement can be positioned on the inside of a windshield of a vehicle. This means that the camera unit can be positioned in a suitable position in the vehicle, while being supported by the carrier arrangement and configured with a given detection area ahead of the vehicle or around the vehicle.

It is previously known that the carrier arrangement may include a frame or plate which is arranged so as to be attached to a vehicle windshield and which is also connected to a support device which is attached to the frame. Also, the support device incorporates suitable attachment means which are configured for supporting the camera unit. Furthermore, the carrier arrangement is suitably attached to the windscreen by means of a suitable adhesive.

It is a general problem in this field of technology to provide systems which are configured for forcing away and cooling heated air from the camera unit and other relevant components which are heated during operation of the camera unit. In particular, such systems must be compact, silent and also must not obstruct the view of a driver of the vehicle in question. The systems must also be able to adapt to different windshields having different shapes and angles of inclination.

A previously known camera arrangement of the above-mentioned type is known from U.S. Publication No. 2017/0184945 A1. This known arrangement is based on a camera arrangement which features a mounting device for a camera unit and which is configured to be attached to a windshield of a vehicle. The arrangement also includes a heat transfer device, a fan and a motor for operating the fan. In particular, the arrangement comprises a fan which is arranged for transporting air through a housing of a camera unit.

Even though the arrangement according to U.S. Publication No. 2017/0184945 A1 is configured in a manner so as to be mounted to a windshield and to transport heated air, there is a need for further improvements within this field of technology. In particular, there is a demand for improved cooling of hot air which has been heated by the electronics and camera unit, while still obtaining an efficient camera arrangement.

For the above-mentioned reasons, it is an object of embodiments of the present disclosure to provide a carrier arrangement for a camera arrangement by which the above-mentioned drawbacks and challenges related to the prior art can be solved.

SUMMARY

In accordance with the disclosure, the above-referenced object is achieved by provision of a camera arrangement for mounting in a vehicle and including a carrier arrangement configured so as to be attached to the vehicle in order to support a camera housing which carries a camera unit. The camera arrangement includes a fan unit with a fan wheel which is configured for forcing air heated by the camera arrangement into the interior of the vehicle, and a fan motor for operating the fan wheel. Furthermore, the fan motor includes a fan motor axle which is connected to the fan wheel and which is configured with a generally vertical orientation when the camera arrangement is mounted in the vehicle.

A number of advantages are obtained by the camera arrangement according to the present disclosure. Mainly, the camera arrangement according to the disclosure will provide improved cooling of hot air from the electronics and camera unit, and also efficient transport of air away from the windshield, while still achieving a space-saving and efficient camera arrangement.

The carrier arrangement according to the disclosure is suitably used with a road vehicle such as a car, truck or other road vehicle, but can also in principle be used with any other vehicle having a windshield adapted for mounting the above-mentioned carrier arrangement on an interior side of the windshield.

Other aspects of the present disclosure are disclosed in the dependent claims.

According to some aspects of embodiments of the present invention, the fan motor axle is arranged with an angle with reference to a vertical axis which is less than 25°.

According to some aspects of embodiments of the present invention, the fan motor axle is arranged with an angle with reference to a vertical axis which is less than 5°.

According to some aspects of embodiments of the present invention, the camera arrangement also includes a fan housing which supports the fan unit.

According to some aspects of embodiments of the present invention, the fan housing provides an arrangement of heatsink fins for cooling air which is forced into the interior of the vehicle.

According to some aspects of embodiments of the present invention, the fan housing includes a cover unit which at least partly surrounds the fan wheel and includes a wall structure for the fan unit.

According to some aspects of embodiments of the present invention, the fan housing is shaped with a single outlet, forcing air in one direction, or a double outlet, forcing air in two separate directions.

According to some aspects of embodiments of the present invention, the fan housing is configured to be mounted on the underside of the camera housing when said the camera arrangement is mounted in the vehicle.

According to some aspects of embodiments of the present invention, the camera arrangement includes an electronics unit, being configured for controlling the operation of the camera unit, which is arranged between the camera housing and the fan housing.

According to some aspects of embodiments of the present invention, the fan motor axle is rotatably arranged in the fan motor by means of fluid bearings.

According to some aspects of embodiments of the present invention, the carrier arrangement includes a base plate which is configured to be attached to the inside of a windshield of the vehicle.

According to some aspects of embodiments of the present invention, the fan is configured for forcing air in a direction which is substantially parallel to a windshield of the vehicle.

According to some aspects of embodiments of the present invention, the fan unit is arranged in an enclosure which defines a space for guiding air past the fan wheel.

BRIEF DESCRIPTION OF THE DRAWINGS

The present disclosure will now be described more in detail with reference to the appended drawings, where.

DETAILED DESCRIPTION

Figure 1:
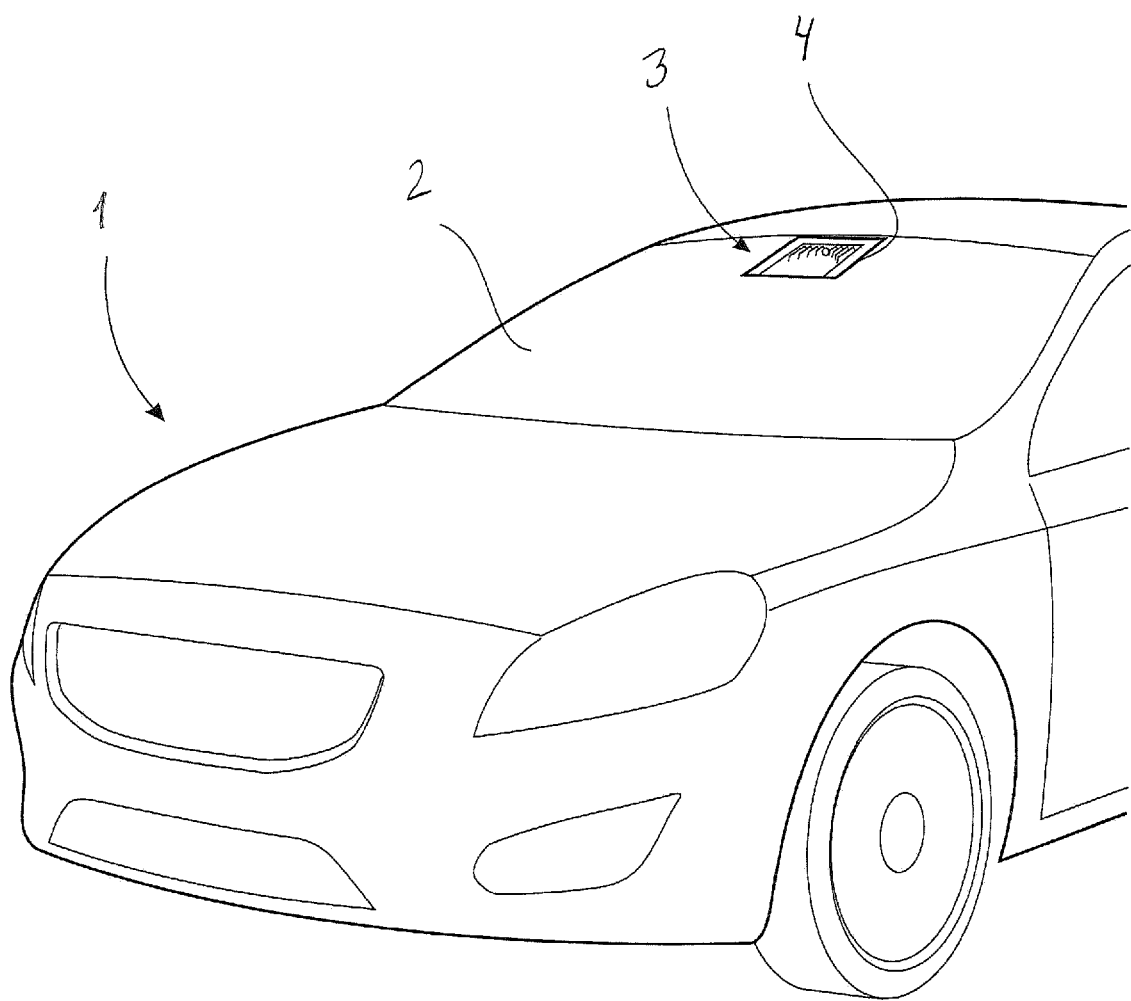
FIG. 1 shows a perspective view of a front part of a vehicle.

FIG. 1 schematically shows a perspective view of a vehicle 1, which according to an embodiment is a regular car, having a windshield 2. According to an embodiment, the vehicle 1 is equipped with a camera arrangement 3 which is mounted on the inside of the windshield 2, i.e. the side of the windshield 2 facing the interior of the vehicle 1. The camera arrangement 3 includes a carrier arrangement 4 for a camera unit, which will be described in greater detail below.

The camera arrangement 3 is particularly intended to be used on road vehicles, primarily in the form of cars, trucks and buses and similar vehicles, but can alternatively be used in other vehicles.

Figure 2:
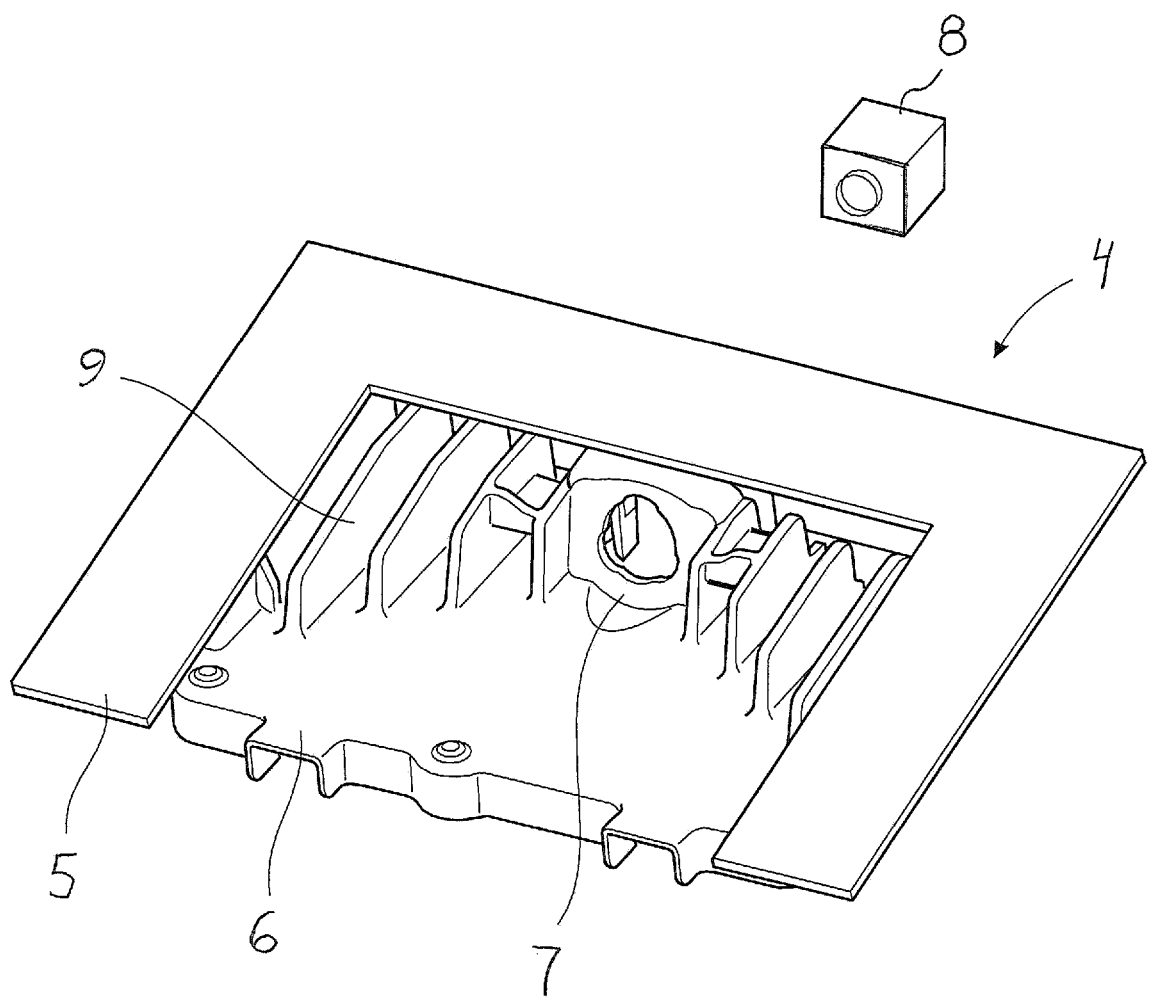
FIG. 2 shows a perspective view of a carrier arrangement and a camera unit according to the present disclosure.

As shown in FIGS. 1 and 2, the carrier arrangement 4 includes a base plate 5 which is formed as a generally U-shaped frame element. The upper side of the base plate 5 is suitably provided with an adhesive for gluing it to the inside of the windshield 2.

Furthermore, the carrier arrangement 4 includes a support device which is configured as a camera housing 6 with a holder 7 for supporting a camera unit 8 or a similar device. The camera unit 8 is suitably of the type which is configured for supplying images or a video stream of a road ahead of the vehicle 1. For this reason, the camera unit 8 includes an image sensor device, a lens and a control unit. Such components are well known in the field of camera technology, and for this reason they are not described in detail here. In this manner, the camera unit 8 can, for example, be used in a vehicle system for detection of road conditions, for speed control, for navigation, or in connection with systems for autonomous driving or similar fields of use. These fields of technology are mentioned here purely as examples.

Furthermore, it should be noted that the camera unit 8 is shown in FIG. 2 separately and in a schematic manner since the camera unit 8 is normally marketed and sold as a piece of equipment which is separate from the carrier arrangement 4.

According to different embodiments of embodiments of the present invention, the camera housing 6 can be configured for supporting other units than a camera unit 8, for example a radar device or other types of sensors which can be suitable for detection systems in road vehicles.

The carrier arrangement 4 is suitably configured with a fastening arrangement for attaching the camera housing 6 to the base plate 5. Such a fastening arrangement is not shown in detail in this disclosure. According to known technology, the fastening arrangement may be constituted by a plurality of locking elements which are arranged on the camera housing 6 and which are configured for cooperating with corresponding elements arranged on the base plate 5.

Furthermore, as shown in FIG. 2, the camera housing 6 is provided with a cooling arrangement in the form of a number of cooling fins 9 for absorbing heat which can be expected to be generated by the camera unit 8 and other related components during operation.

Figure 3:
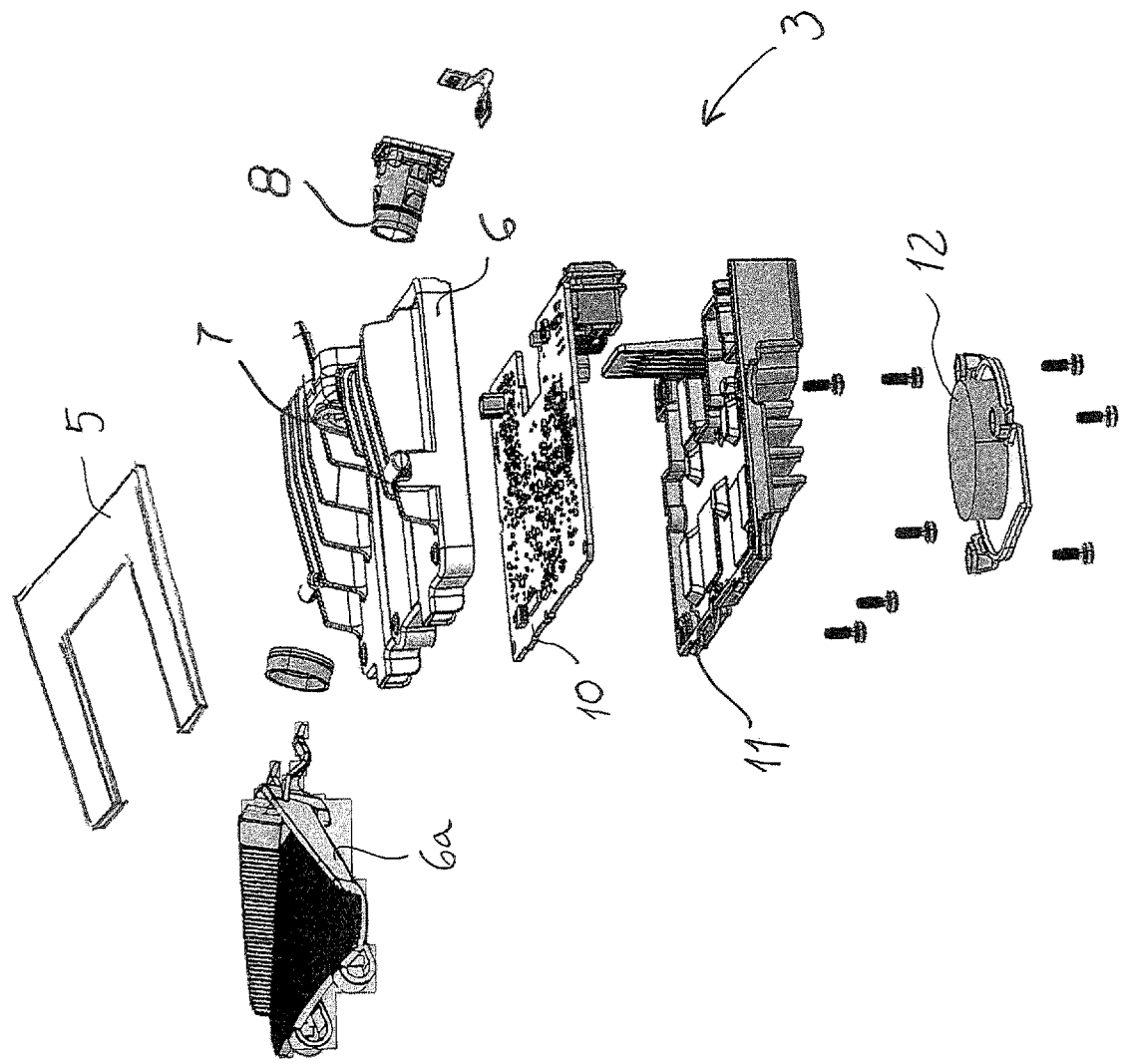
FIG. 3 shows a perspective view of a camera arrangement according to the disclosure.

With reference to FIG. 3, there is shown a perspective view of the camera arrangement 3 according to the disclosure and in an exploded view. As mentioned above, the camera housing 6 is configured for supporting the camera unit 8 and is also fastened to the base plate 5. The base plate 5 is fastened on the inside of the windshield (not shown in FIG. 3). Furthermore, an electronics unit 10 is mounted on the underside of the camera housing 6, which for this reason is formed so as to accommodate the electronics unit 10. The electronics unit 10 includes components for controlling the operation of the camera unit 8.

According to the shown embodiment, the camera housing 6 is provided with a light trap 6a, which can optionally be mounted on the camera housing 6 and which is adapted for reducing disturbing light towards the camera unit 8.

Furthermore, a cover unit 11 is arranged on the underside of the electronics unit 10. This means that the electronics unit 10 is generally enclosed by the camera housing 6 and the cover unit 11. Also, on the underside of the cover unit 11, a fan unit 12 is mounted. This means that a fan housing is defined on the underside of the cover unit 11, through the fact that the cover unit 11 is arranged so as to accommodate the fan unit 12. This will be described in further detail below with reference to FIGS. 5 and 6 (see in particular reference numeral 13).

Figure 4:
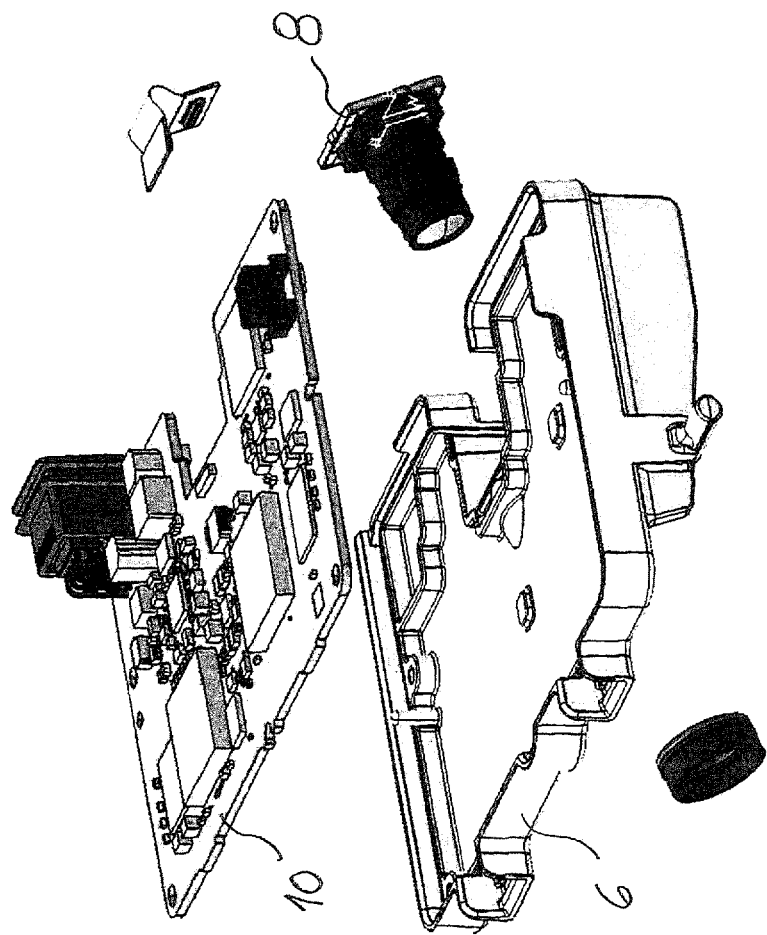
FIG. 4 shows a perspective view of an electronics unit and a camera housing, shown turned upside down as compared with FIG. 3.

FIG. 4 is a perspective view showing how the electronics unit 10 is mounted in the camera housing 6. It should be noted that, for reasons of clarity, the components shown in FIG. 4 are turned upside down as compared with FIG. 3.

Figure 5:
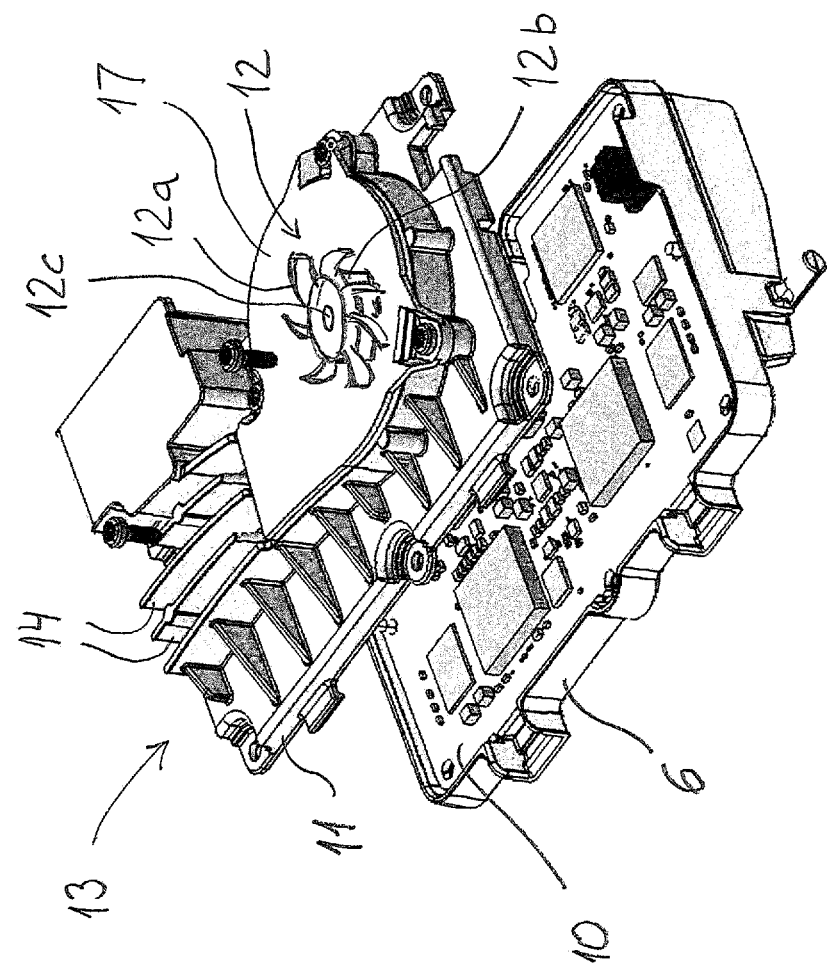
FIG. 5 shows a perspective view of a fan housing as mounted to the camera housing, also turned upside down as compared with FIG. 3.

Furthermore, FIG. 5 is a perspective view showing how the fan housing 13, being formed by the cover unit 11 and including the fan unit 12, is mounted on the camera housing 6. It should be noted that the components of FIG. 5 are also turned upside down as compared with FIG. 3. As indicated in FIG. 5, the electronics unit 10 is mounted in a cavity formed by the camera housing 6, and the cover unit 11 which is formed also as the fan housing 13 is mounted so as to cover the electronics unit 10. The reverse side of the fan housing 13 (i.e. the upper side shown in FIG. 5) is formed so as to accommodate the fan unit 12. Referring back to FIG. 3, it is clear that the fan unit 12 is mounted on the lowermost end of the camera arrangement 3 when the camera arrangement 3 is mounted in the vehicle 1 during normal operation of the camera arrangement 3.

FIG. 5 also shows the general design of the fan unit 12, i.e. including a fan wheel 12a and a fan motor 12b with a fan motor axle 12c for operating the fan wheel 12a.

The fan wheel 12a is configured for forcing air heated by the camera arrangement 3 into the interior of the vehicle 1. Also, the fan motor 12b includes the fan motor axle 12c which is connected to the fan wheel 12a. Furthermore, the fan motor axle 12c is configured with a generally vertical orientation, i.e. extending along a generally vertical axis, when the camera arrangement 3 is mounted in the vehicle 1 in its normal operating condition.

Furthermore, the fan housing 13 suitably includes a cover plate 17 which covers and encloses the fan wheel 12a, fan motor 12b and fan motor axle 12c. In other words, the fan unit 12 is mounted underneath the cover plate 17.

Figure 6:
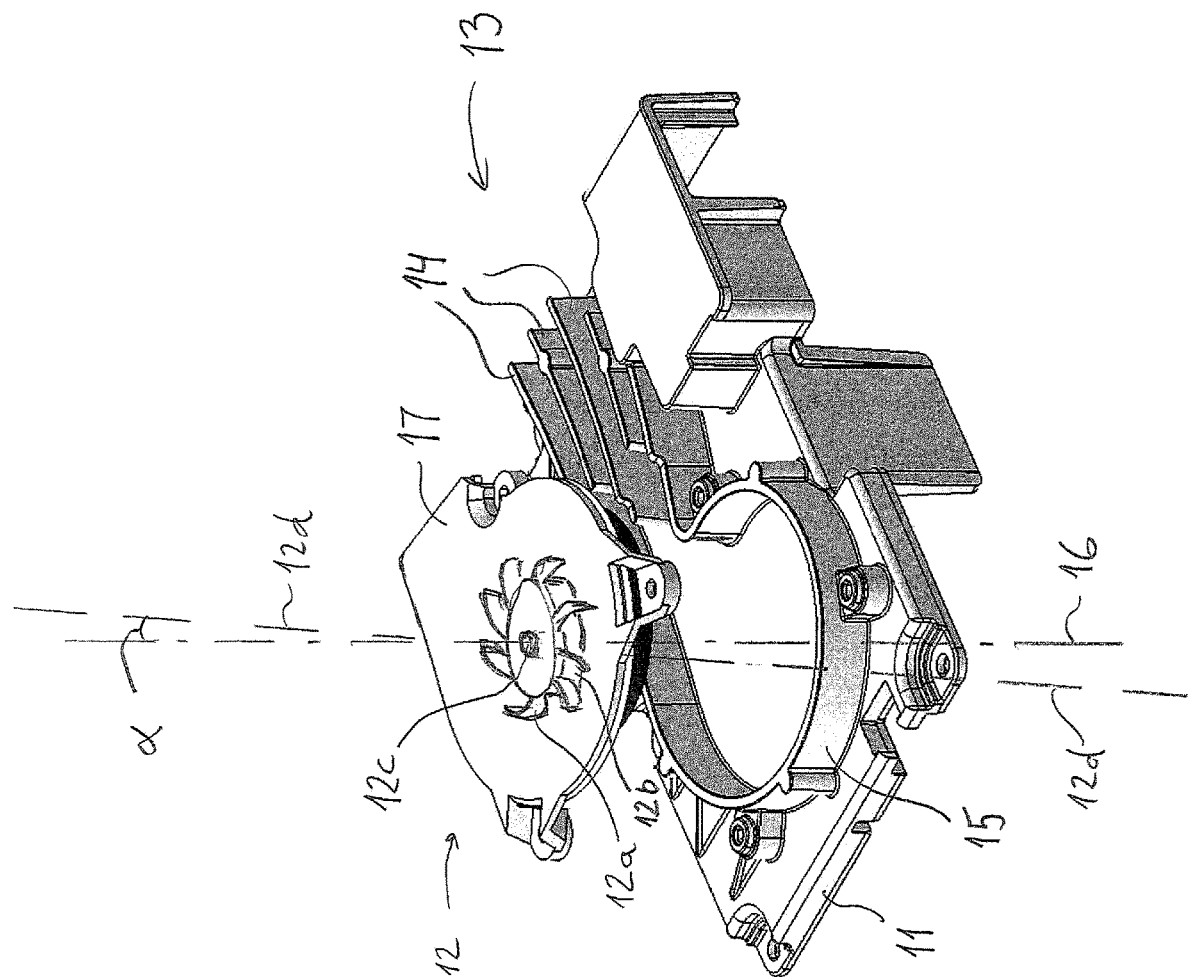
FIG. 6 shows a perspective view of the fan housing as mounted in a cover unit.

Referring now to FIG. 6, there is shown how the fan unit 12 is mounted so that it is supported by the fan housing 13. FIG. 6 also shows that the fan housing 13 cover unit 11 includes an arrangement of heatsink fins 14 for cooling the air which is forced into the interior of the vehicle 1, i.e. for cooling air which is heated by the components forming part of the camera arrangement 3. More precisely, the heatsink fins 14 are formed as a number of guiding fins 14 which extend from the fan housing 13-cover unit 11 and which together are formed as an air duct for guiding air from the fan 12a and towards the interior of the vehicle while cooling the air.

Furthermore, the cover unit 11 defines a wall structure 15 which is formed so as to surround the fan wheel 12a and which is at least partly shaped as a wall for the fan unit 12. Suitably, the wall structure 15 is generally circular in order to accommodate the fan wheel 12a. As shown in FIG. 6, the wall structure 15 is also formed so as to connect with the air duct being defined by the heatsink fins 14.

Consequently, the cover unit 11 is formed with a wall structure 15 which forms a part of an enclosing structure for the fan unit 12. This means that the fan unit 12 itself does not have to be formed with any wall or side structure to accommodate the fan wheel 12a.

As mentioned above, the fan motor axle 12c is configured with a generally vertical orientation, i.e. along an imaginary axis 12d. According to an embodiment, the fan motor axle 12c defines an angle $\alpha$ with reference to a vertical axis 16 which is less than 25°. According to a further embodiment, the fan motor axle 12c defines an angle $\alpha$ with reference to a vertical axis 16 which is less than 5°. This vertical orientation of the fan motor axle 12c allows a compact camera arrangement 3 which can be mounted inside a windshield in a space-saving manner while allowing hot air to be guided away from the camera arrangement 3.

According to the embodiment shown in FIGS. 5 and 6, the fan housing 13 is shaped with an air duct defined along the heatsink fins 14, which consequently defines a single outlet from the fan unit 12 to the interior of the vehicle. It should be noted that suitably, the fan wheel 12a is configured for forcing air in a direction which is substantially parallel to the windshield 2.

According to a further embodiment, the fan housing 13 can be designed with several sets of heatsink fans which consequently define two or more outlets for air, in two or more directions along the windscreen.

Figure 7:
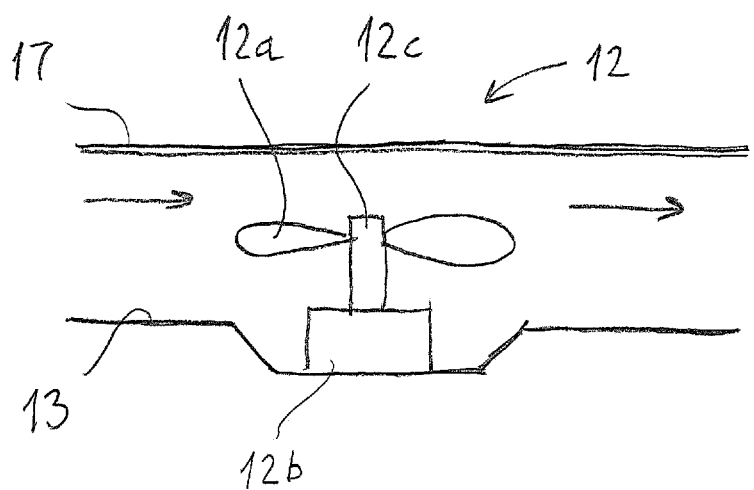
FIG. 7 shows a side view of a fan unit according to an embodiment.

With reference to FIG. 7, there is shown a simplified side view of an embodiment including a fan unit 12 with a fan wheel 12a and a fan motor 12b. According to this embodiment, the fan motor 12b is mounted on a bottom surface of the fan housing 13 so that the fan motor axle 12c extends upwards and generally in a vertical manner, as described above. Furthermore, there is a space, in the vertical direction, between the upper end of the fan motor axle 12c and the underside of the cover plate 17. In this manner, an enclosure 18 is formed for the fan unit 12 in a manner so that the enclosure 18 defines an available space in its upper part between the upper end of the fan motor axle 12c and the cover plate 17 which is used for guiding away air above the fan unit 12, i.e. by passing the fan wheel 12a, and for cooling. Furthermore, the embodiment shown in FIG. 7 is arranged so that the fan motor 12b is arranged in a recessed section 19 in the bottom surface of the enclosure 18.

Also, it should be noted that the fan motor 12b is not provided with any specific housing. Instead, the wall structure 15 shown in FIG. 6 is used for enclosing the fan motor 12b.

Also, according to a further embodiment, a fan housing may accommodate more than one fan unit, with corresponding air outlets corresponding to the embodiment mentioned above.

Furthermore, according to an embodiment, the fan motor axle 12c is rotatably arranged in the fan motor 12b by means of fluid bearings, which allows efficient operation of the fan unit 12.

The present disclosure is not limited to the examples above, but may vary freely within the scope of the appended claims. For example, the disclosure may relate to different types of vehicles and also different types of a camera units.

Generally, and with reference to the appended drawings, the present disclosure relates to a camera arrangement 3 for mounting in a vehicle 1 and including a carrier arrangement 4 configured so as to be attached to the vehicle 1 in order to support a camera housing 6 which carries a camera unit 8. The camera arrangement 3 includes a fan unit 12 with a fan wheel 12a which is configured for forcing air heated by the camera arrangement 3 into the interior of the vehicle 1, and a fan motor 12b for operating the fan wheel 12a. The fan motor 12b includes a fan motor axle 12c which is connected to the fan wheel 12a and which is configured with a generally vertical orientation when the camera arrangement 3 is mounted in the vehicle 1.

According to some aspects of embodiments of the present invention, the fan motor axle 12c is arranged with an angle with reference to a vertical axis 16 which is less than 25°.

According to some aspects of embodiments of the present invention, the fan motor axle 12c is arranged with an angle with reference to a vertical axis 16 which is less than 5°.

According to some aspects of embodiments of the present invention, the camera arrangement 3 includes a fan housing 13 which supports the fan unit 12.

According to some aspects of embodiments of the present invention, the fan housing 13 includes an arrangement of heatsink fins 14 for cooling the air which is forced into the interior of the vehicle 1.

According to some aspects of embodiments of the present invention, the fan housing 13 includes a cover unit 11 which at least partly surrounds the fan wheel 12a and includes a wall structure 15 for the fan unit 12.

According to some aspects of embodiments of the present invention, the fan housing 13 is shaped with a single outlet, forcing air in one direction, or a double outlet, forcing air in two separate directions.

According to some aspects of embodiments of the present invention, the fan housing 13 is configured to be mounted on the underside of the camera housing 6 when the camera arrangement 3 is mounted in the vehicle 1.

According to some aspects of embodiments of the present invention, the camera arrangement 3 includes an electronics unit 10, being configured for controlling the operation of the camera unit 8, which is arranged between the camera housing 6 and the fan housing 13.

According to some aspects of embodiments of the present invention, the fan motor axle 12c is rotatably arranged in the fan motor 12b by means of fluid bearings.

According to some aspects of embodiments of the present invention, the carrier arrangement 4 includes a base plate 5 which is configured to be attached to the inside of a windshield 2 of the vehicle 1.

According to some aspects of embodiments of the present invention, the fan wheel 12a is configured for forcing air in a direction which is substantially parallel to a windshield 2 of the vehicle 1.

According to some aspects of embodiments of the present invention, the fan unit 12 is arranged in an enclosure 18 which defines a space for guiding air past the fan wheel 12a.

While the above description constitutes the preferred embodiment of the present invention, it will be appreciated that the invention is susceptible to modification, variation and change without departing from the proper scope and fair meaning of the accompanying claims.

The invention claimed is:

1. A camera arrangement adapted for mounting in a vehicle comprising; a carrier arrangement configured so as to be attached to the vehicle in order to support a camera housing which carries a camera unit, the camera arrangement further comprising a fan unit with a fan wheel which is configured for forcing air heated by the camera arrangement into the interior of the vehicle, and a fan motor for operating the fan wheel, the fan motor comprises a fan motor axle which is connected to the fan wheel and which is configured with a generally vertical orientation when the camera arrangement is mounted in the vehicle, a cover unit adapted to be mounted to the camera housing, a fan unit affixed to the cover unit, the cover unit forming a wall structure partially encircling the fan unit and forming an air duct, and an arrangement of heatsink fins formed by the cover unit within the air duct for cooling air which is forced into the interior of the vehicle, the cover unit at least partly surrounds the fan wheel and with the wall structure guides air from the fan wheel to flow into the air duct and across the heatsink fins, and a cover plate affixed to the cover unit to enclose the fan motor and fan wheel.

2. The camera arrangement according to claim 1, further comprising the fan motor axle is arranged with an angle with reference to a vertical axis which is less than 25°.

3. The camera arrangement according to claim 1, further comprising the fan motor axle is arranged with an angle with reference to a vertical axis which is less than 5°.

4. The camera arrangement according to claim 1, further comprising the fan housing is shaped with a single outlet, forcing air in one direction, or a double outlet, forcing air in two separate directions.

5. The camera arrangement according to claim 1, further comprising the fan housing is configured to be mounted on the underside of the camera housing when the camera arrangement is mounted in the vehicle.

6. The camera arrangement according to claim 1, further comprising an electronics unit which is configured for controlling the operation of the camera unit and which is arranged between the camera housing and the fan housing.

7. The camera arrangement according to claim 1, further comprising the fan motor axle is rotatably arranged in the fan motor by means of fluid bearings.

8. The camera arrangement according to claim 1, wherein the carrier arrangement comprises a base plate which is configured to be attached to the inside of a windshield of the vehicle.

9. The camera arrangement according to claim 1, further comprising the fan wheel is configured for forcing air in a direction which is substantially parallel to a windshield of the vehicle.

10. The camera arrangement according to claim 1, further comprising the fan unit is arranged in an enclosure which defines a space for guiding air past the fan wheel.

* * * * *